(12) United States Patent
Seiler

(10) Patent No.: US 12,449,912 B2
(45) Date of Patent: Oct. 21, 2025

(54) TOUCHLESS USER-INTERFACE CONTROL METHOD INCLUDING FADING

(71) Applicant: AMERIA AG, Heidelberg (DE)

(72) Inventor: Martin Seiler, Ehrenkirchen (DE)

(73) Assignee: AMERIA AG, Heidelberg (DE)

( * ) Notice: Subject to any disclaimer, the term of this patent is extended or adjusted under 35 U.S.C. 154(b) by 0 days.

(21) Appl. No.: 19/109,611

(22) PCT Filed: Sep. 14, 2023

(86) PCT No.: PCT/EP2023/075332
§ 371 (c)(1),
(2) Date: Mar. 7, 2025

(87) PCT Pub. No.: WO2024/061742
PCT Pub. Date: Mar. 28, 2024

(65) Prior Publication Data
US 2025/0258553 A1    Aug. 14, 2025

(30) Foreign Application Priority Data

Sep. 19, 2022 (EP) .................................. 22196433

(51) Int. Cl.
*G06F 3/03* (2006.01)
*G06F 3/01* (2006.01)

(52) U.S. Cl.
CPC ............ *G06F 3/0304* (2013.01); *G06F 3/017* (2013.01)

(58) Field of Classification Search
CPC .............................. G06F 3/0304; G06F 3/017
See application file for complete search history.

(56) References Cited

U.S. PATENT DOCUMENTS

| | | | | |
|---|---|---|---|---|
| 9,858,640 | B1* | 1/2018 | Earl | G06T 11/60 |
| 9,959,463 | B2* | 5/2018 | Rafii | H04N 21/44218 |
| 10,007,349 | B2* | 6/2018 | Latta | G06F 3/017 |
| 10,459,525 | B2* | 10/2019 | Strutt | G06F 3/017 |
| 10,606,468 | B2* | 3/2020 | Gu | G06F 3/0418 |
| 10,663,590 | B2* | 5/2020 | Rzeszutek | G01S 17/87 |
| 11,080,286 | B2* | 8/2021 | Akman | G06T 17/20 |
| 11,126,850 | B1* | 9/2021 | Ichim | A63F 13/655 |
| 11,315,262 | B1* | 4/2022 | Cherevatsky | H04N 7/188 |
| 2011/0050640 | A1* | 3/2011 | Lundback | G06F 3/0488 345/175 |

(Continued)

FOREIGN PATENT DOCUMENTS

EP    2891950 A1    7/2015

OTHER PUBLICATIONS

International Search Report and Written Opinion issued in App. No. PCT/EP2023/075332, dated Nov. 30, 2023, 8 pages.

*Primary Examiner* — Grant Sitta
(74) *Attorney, Agent, or Firm* — Blueshift IP; Robert Plotkin

(57) ABSTRACT

A computer-implemented touchless user-interface control method for an electronic display, comprising: detecting, using at least a first and a second depth camera, an input object and determining a set of 3D-points corresponding to the input object; wherein the set of 3D-points includes a first subset of 3D-points which is based on data captured by the first depth camera, and a second subset of 3D-points which is based on data captured by the second depth camera; performing 3D-point-fading, wherein weights are assigned to the 3D-points.

11 Claims, 20 Drawing Sheets

(56) References Cited

U.S. PATENT DOCUMENTS

| | | |
|---|---|---|
| 2012/0326995 A1 | 12/2012 | Zhang |
| 2013/0234931 A1* | 9/2013 | Keranen ................ G06F 3/017 29/592.1 |
| 2013/0257736 A1* | 10/2013 | Hou ...................... G06F 3/0304 345/156 |
| 2014/0002417 A1* | 1/2014 | Yoshida ................ G06F 3/0421 345/174 |
| 2014/0104394 A1* | 4/2014 | Yanai ...................... G06F 3/017 348/47 |
| 2014/0313122 A1* | 10/2014 | Tang ...................... G06F 3/017 345/156 |
| 2016/0124513 A1* | 5/2016 | Dal Zot ................. G06F 3/017 715/863 |
| 2020/0038120 A1 | 2/2020 | Ziraknejad |
| 2021/0294421 A1* | 9/2021 | Wang ................... G06V 10/147 |

* cited by examiner

TOUCHLESS USER-INTERFACE CONTROL METHOD INCLUDING FADING

TECHNICAL FIELD

The present invention generally relates to controlling a touchless user-interface, and more particularly to a touchless user-interface control method for an electronic display. Further, the present invention relates to a use of one or more depth cameras in a touchless user-interface control method, and to a data processing apparatus for carrying out a touchless user-interface control method.

BACKGROUND

Electronic displays have nowadays become omnipresent in various areas of modern life. Examples include electronic display screens or electronic display projectors in public places which provide useful information to the user, e.g. in shopping malls, trade shows, train stations, airports, and the like, a field which is commonly termed "digital signage". One form of such electronic displays are touchscreens that provide a user-interface including interactive functions to allow users to interact with the information, e.g. by selecting control elements such as buttons, selecting items from a list, controlling a cursor, and the like. Such public touchscreens are nowadays used e.g. in ticketing machines, check-out systems in supermarkets or restaurants, interactive signposts, and the like.

However, not least because of the recent COVID-19 pandemic, users have become hesitant to use touchscreens in public places because of health concerns. This has created a desire to provide input capabilities, in particular gesture control, without having to physically touch the display. Some commercial products have already addressed this desire, for example:

The touchless air gesture technology of Gestoos (https://gestoos.com/) aims at transforming touchscreens or digital displays into a touch-free experience. The Gestoos technology uses a depth sensor to allow the user to control the mouse cursor of the operating system, mapping the finger coordinates to its screen position, while the fingers stay at a distance from the screen.

GLAMOS (https://www.kickstarter.com/projects/300948436/glamos-bring-your-touchless-screens-to-life), sets out to use lidar technology to turn screens into interactive touch screens.

AIRxTOUCH (https://www.airxtouch.com/) provides an all-in-one touchless interactive kiosk. Depth sensors detect the user's finger before it touches the display and generates click events. The related international patent application WO 2015/139969 provides technological background.

Touchjet (https://www.touchjet.com/wave-lily/) aims at turning flat screen TVs into a tablet for collaboration and interactive presentations using a digital pen.

Ultraleap (https://developer.leapmotion.com/touchfree/) provides leapmotion, which is a small device (infrared camera) with relatively small range for hand tracking and hand gesture recognition. The system uses a single camera, so that the hand recognition precision is limited and decreases the bigger the screen is.

The known technologies provide the control of a touchless user-interface based on detecting an input object, e.g. an input device of a hand. However, the existing solutions on the market are improvable with regard to the smooth and stable user experience, e.g. for reliably detecting touchless control input and providing comprehensible feedback for the user.

It is therefore the technical problem underlying the present invention to provide an improved touchless user-interface control method for an electronic display, thereby at least partly increasing the usability compared to known solutions of the prior art.

SUMMARY

The problem is solved by the subject-matter defined in the independent claims. Advantageous modifications of embodiments of the invention are defined in the dependent claims as well as in the description and the figures.

According to a first aspect of the present invention, a computer-implemented touchless user-interface control method for an electronic display is provided. The method may comprise detecting an input object and determining a set of 3D-points corresponding to the input object. For detecting, at least a first and a second depth camera may be used. The set of 3D-points may include a first subset of 3D-points which may be based on data captured by the first depth camera, and a second subset of 3D-points which may be based on data captured by the second depth camera. The method may comprise performing 3D-point-fading, wherein weights are assigned to the 3D-points.

Touchless user-interface control may include any type of interaction of a user with a user-interface without the user being required to make physical contact. In particular, touchless input to an electronic display is included. Examples for touchless inputs are movements of a cursor which is displayed to the user via the electronic display, click operations or gestures.

For touchless user-interface control, in particular for touchless input, an input object may be used. The term input object includes any kind of suitable input object such as a hand or a finger of a user, a dedicated input device which may for example be a pen or a spherical device.

The term electronic display may include all types of suitable systems for providing a visual user-interface to a user, for example electronic display screens or electronic display projectors. In particular, the term electronic display screen may include any type of display that is directly powered by electrical energy. In particular, it includes all types of LCD screens, LED screens, touch screens, e-ink screens and the like. The size and shape of the screens may vary.

It may be provided that the electronic display defines an input area. The term input area refers in general to the display layer of the electronic display on which content may be displayed during an interaction of a user and with which a user may interact. The input area may be observed at least partially by the depth cameras to recognize touchless inputs of users. For example, the input area may include or be equal to a virtual click layer which is defined to extend distanced by a predetermined distance essentially parallel to the electronic display and which is configured to recognize click inputs or gesture inputs depending on whether an input object penetrates the virtual click layer.

The first and the second depth camera may be placed opposing each other. For example, the first depth camera may be placed at or near an upper edge of the electronic display while the second depth camera may be placed at or near a lower edge of the electronic display, wherein the depth cameras face each other. For example, if the electronic display screen comprises a framing, the first and the second depth camera may be mounted at this framing. The depth cameras may for example be stereovision infrared depth cameras. One example for such a depth camera is the Intel RealSense depth camera. In other words, the two depth cameras may be arranged at opposing borders of the electronic display, for example one being mounted at an upper border and one being mounted at a lower border of the electronic display such that both of the depth cameras are able to observe an area which is e.g. parallel to the display layer.

Detecting the input object through the depth cameras may be performed as described in the following: The first depth camera detects the input object from its perspective, i.e. direction of view. The second depth camera also detects the input object from its perspective, i.e. direction of view. Image data captured by the first depth camera and image data captured by the second depth camera are thereby obtained. The image data of the first depth camera comprise a point cloud or are transformed into a point cloud. This is the first subset of 3D-points. Accordingly, the image data of the second depth camera comprise a point cloud or are transformed into a point cloud. This is the second subset of 3D-points. In other words, the first subset of 3D-points may be associated with the first depth camera, and the second subset of 3D-points may be associated with the second depth camera. The 3D-points may be virtual 3D-points not being displayed to a user, but only being used for performing the touchless user-interface control method.

The 3D-points of the first subset of 3D-points and the second subset of 3D-points correspond to the input object, but however they may be partly identical points of the input object, or different points of the input object. This depends on whether sections of the input object are detected by only one depth camera or by both depth cameras. In other words, if both depth camera detect a respective section of the input object, 3D-points of the first subset of 3D-points and 3D-points of the second subset of 3D-points may be defined to be in the same 3D-position, i.e. overlapping. The first and the second subset of 3D-points may be combined in one set of 3D-points to represent the input object at a higher resolution than if it were only represented by one subset of 3D-points. Thus, the position of the input objects can be determined precisely. In particular, successive positions of the input object can be determined, for example to recognize a click input or a gesture input. The 3D-points correspond to the input object may be understood such as the 3D-points geometrically represent the input object, i.e. being an at least partial virtual representation of the input object.

During a touchless interaction of a user using an input object, depending on the position of the input object relative to the first and the second depth camera, undesired discontinuities may occur with respect to the detected position of the input object. An example for an undesired discontinuity it a leap of a cursor which is displayed by the electronic display corresponding to the detected position of the input object. This can impair the touchless interaction and especially the user experience. Most of such discontinuities are due to the fact that certain 3D-points are no longer recognized correctly, for example because one depth camera is not able to recognize the input object in a certain position. By assigning weights to the 3D-points, preferably individually to each of the 3D-points, this problem can be reduced thereby improving the user experience. A weight of a 3D-point can be understood as the valence of a point relative to the other points. The weights may be taken into account when determining the position and/or shape of the input object. Therefore, for recognizing a touchless input such as a click input or a gesture input, the weights may stabilize and smoothen the detected position of the input object.

In various implementations of a touchless user-interface control method, it may be provided that the position of the input object is displayed to the user on the electronic display irrespective of a specific input such that the user can see where on the electronic display he is pointing. For example, a hovering cursor may be provided, wherein the position of the hovering cursor corresponds to the position of the input object. In other words, the hovering cursor may visualize the position of the input object in order to support the user even before an actual input, e.g. a click input or gesture input, is made. In these implementations, the proposed method is particularly advantageous due to the fact that discontinuities would be directly visible to the user and cause confusions.

The term 3D-point-fading includes all types of complete and/or partial fading out and/or fading in of 3D-points. The fading out and/or fading in of the 3D-points has a direct effect on the recognition of the input object, in particular on the recognition of the touchless control pointer. Assigning weights to the 3D-points allows partial fading in and/or fading out of 3D-points.

The method may further comprise determining a touchless control pointer based on the 3D-points and the assigned weights.

Since an input object generally not only consist of parts that are relevant for a touchless input, but also has peripheral parts, the part that is relevant for a touchless input must be identified. The input object is represented by the set of 3D-points as described above. Since the set of 3D-points corresponds to the input object, it includes not only the relevant part for a touchless input, but also the peripheral parts that are not relevant for the touchless input. The method step of determining a touchless control pointer allows to find and recognize the relevant part of the input object based on the set of 3D-points. In other words, the touchless control pointer which is determined, represents the said relevant part of the input object. Therefore, the touchless control pointer may be understood to be a 3D-point which either is defined as an additional 3D-point based on the set of 3D-points, or coincide with one or more 3D-points in the set of 3D-points.

It may be provided that the touchless control pointer corresponds to a center point of an input object or to a tip of an input object or to a central point of a tip of an input object. The tip of an input object may be a tip which is facing the electronic display. In particular, if a finger is used as an input object, the touchless control pointer may be the fingertip or the center of the fingertip, which is preferably determined from the 3D-points.

Determining the touchless control pointer when a finger is used as an input object may for example be performed as follows: First, the user's hand is detected by means of the first and the second depth camera, wherein one finger is extended pointing towards the electronic display. The data captured by the first depth camera corresponds to a first subset of 3D-points and the data captured by the second depth camera corresponds to a second subset of 3D-points. The two subsets of 3D-points form a set of 3D-points representing the user's hand. The highest elevation of the hand in the direction of the electronic display is detected, which is the index finger that the user extends. The 3D-points located in an area around the detected highest elevation, i.e. at the tip of the index finger, are used to determine the touchless control pointer. For this purpose, a center point is determined from the 3D-points, including the weighting of the points. In particular, the center point calculation can be the calculation of a geometric center point in 3D space. Preferably, the center of gravity is not determined, but the center of volume is determined. Further, preferably any inhomogeneity of the density of the 3D points is factored out so as not to cause any displacement of the touchless control pointer to one side of the finger.

Further, it may be provided that 3D-points of the first subset are weighted depending on their positions relative to the first depth camera, and 3D-points of the second subset are weighted depending on their positions relative to the second depth camera.

As described above, the accuracy of a detected position of a 3D-point depends on its position relative to the respective depth camera which detects the 3D-point. In particular, if a 3D-point is too close to the respective depth camera, discontinuities of the 3D-point may occur. Therefore, the weight of the 3D-points is determined depending on their positions relative to the first depth camera. For example, 3D-points having a position closer to their respective depth camera may have a lower weight than other 3D-points.

The method may comprise defining, for the first depth camera, a first spatial input area for the recognition of touchless input, the first spatial input area having a first spatial boundary. Further, the method may comprise defining, for the second depth camera, a second spatial input area for the recognition of touchless input, the second spatial input area having a second spatial boundary. The 3D-point-fading may be performed within the respective spatial input area, preferably wherein 3D-points of the first subset are weighted depending on their positions relative to the first spatial boundary, and 3D-points of the second subset are weighted depending on their positions relative to the second spatial boundary.

The term spatial input area may be understood as an at least partially delimited area, preferably a 3D-area, within an observation area, i.e. field of view, of a respective depth camera. In the spatial input area, a respective depth camera may be able to capture valuable data, in particular image data, in particular in the form of 3D-points. Valuable data means data without or with less undesired discontinuities and/or errors. However, also in a spatial input area, discontinuities and/or errors may occur, in particular towards the borders of the spatial input area the precision of detection may become lower. But these discontinuities and/or errors may be at least partially compensated via weighting of the 3D-points, as described below.

In contrast to that, the observation area, i.e. field of view, means a superordinate area in which a depth camera is able to capture data irrespective of possible discontinuities and/or errors. A spatial input area preferably has the shape of a frustum, for example of a cone or of a pyramid. The frustrum may be defined to be open in observation direction of the camera. It may be provided that the first spatial input area and second spatial input area at least partially overlap.

The term spatial boundary may be understood as the aforementioned delimitation of the spatial input area. Since the spatial input area may be partially open in one or more directions, as described above, the spatial boundary may be defined to delimit the spatial boundary only partially, for example at a proximal end of the spatial boundary facing the respective depth camera.

The term touchless input includes any type of interaction of a user with the electronic display without the user being required to make physical contact. Examples for a touchless inputs are movements of a cursor which is displayed to the user via the electronic display, click operations or gestures.

3D-point-fading is performed within the respective spatial input area in order to take into account the different grades of discontinuities and/or errors in different positions in the spatial input area. Preferably, the 3D-points of the first subset are weighted depending on their positions relative to the first spatial boundary, and 3D-points of the second subset are weighted depending on their positions relative to the second spatial boundary. Since the discontinuities and/or errors occur especially in the boundary region of the spatial input areas, the weighting of the 3D-points depending on their position relative to the respective spatial boundary enables a higher precision in the detection of the input object. In particular, this enables the touchless control pointer, which is determined as described above, to be detected precisely and without leaps in position when the input object moves.

It may be further provided that each of the spatial input areas are distanced in a respective observation direction from the respective depth camera.

The level of discontinuities and/or errors usually increases in areas close to the depth camera. By defining the respective spatial input areas in a distanced manner from the respective depth camera, this matter of fact is taken into account, since as described above, the spatial input areas may be understood as an at least partially delimited area in which a respective depth camera may be able to capture valuable data without or with less undesired discontinuities and/or errors.

The method may comprise defining, inside each of the spatial input areas, a spatial fading layer spatially located adjacent to the respective spatial boundary, wherein the spatial fading layers each have a spatial extension. The 3D-point-fading may be performed for 3D-points which are positioned within a respective spatial fading layer. The spatial fading layer may have a predetermined extent, for example 5 cm, substantially perpendicular to the boundary. To put it in other words, the spatial fading layer can be understood as a transition layer in which a 3D-point is given a lower weight depending on its specific position within the layer.

This makes it possible to set up a of buffer zone at the boundary of the spatial input area, which compensates for inaccuracies that may occur towards the boundary of the spatial input layer by fading. It may be provided that fading of the 3D-points is only performed within the spatial fading layer.

Further, it may be provided that the weight of the 3D-points which are within a spatial fading layer is determined based on a weighting function which at least considers the dedicated position of the 3D-points within the spatial fading layer, preferably the distance within the spatial extension perpendicular to the respective spatial boundary.

It may be further provided that the weighting function is a linear function for facilitating continuous weighting, preferably having a range between 0 and 1, wherein the weight of a 3D-point is decreasing along the spatial extension towards the spatial boundary.

It may be provided that the weight of 3D-points which are within the first and second spatial input areas and not within one of the spatial fading layers, is determined irrespective of the dedicated positions of the 3D-points, wherein preferably the weight is 1.

It may be provided that the weight of 3D-points which are outside the first and second spatial input areas is determined irrespective of the dedicated positions of the 3D-points, wherein preferably the weight is 0.

The spatial extension of the spatial fading layers may be adjustable.

Using an adjustable spatial fading layer allows to customize the operation of the touchless user-interface control method to the needs of a user and/or to requirements of a particular application. In particular, the user experience may be improved in a desired manner. For example, inexperienced users may need to select a larger extent of the spatial fading layer to prevent irritation when the cursor leaps. For experienced users, however, a smaller extent of the spatial fading layer may be sufficient.

It may be provided that the spatial fading layer of the first spatial input area is arranged at a predetermined part of the first spatial boundary which is preferably facing the first depth camera, and wherein the spatial fading layer of the second spatial input area is arranged at a predetermined part of the second spatial boundary which is preferably facing the second depth camera.

A high level or number of discontinuities and/or errors can occur in particular at certain sections of a respective spatial boundary. In particular, many discontinuities and/or errors can occur in sections close to a respective depth camera. Thus, it may be desirable only to provide those sections of the spatial boundary with a spatial fading layer which are affected by many discontinuities and/or errors.

The method may comprise outputting a signal upon performing dynamic 3D-point-fading, preferably a visual signal displayed on the electronic display and/or an acoustic signal.

Outputting of a signal may be particularly advantageous for unexperienced users for getting familiar with the touchless user-interface control method.

According to a second aspect of the present invention, the use of a depth camera, preferably at least a first and a second depth camera, is provided in a method according to the first aspect of the present invention.

According to a third aspect of the present invention, it is provided a data processing apparatus, preferably an electronic display, comprising means, preferably at least two depth cameras, for carrying out a method according to the first aspect of the present invention.

According to a fourth aspect of the present invention, a computer program is provided comprising instructions which, when the program is executed by a computer, cause the computer to carry out a method according to the first aspect of the present invention.

All technical implementation details and advantages described with respect to the first aspect of the present invention are self-evidently mutatis mutandis applicable for the second, third and fourth aspects of the present invention and vice versa.

BRIEF DESCRIPTION OF THE DRAWINGS

The disclosure may be better understood by reference to the following drawings.

DESCRIPTION OF PREFERRED EMBODIMENTS

Figure 1:
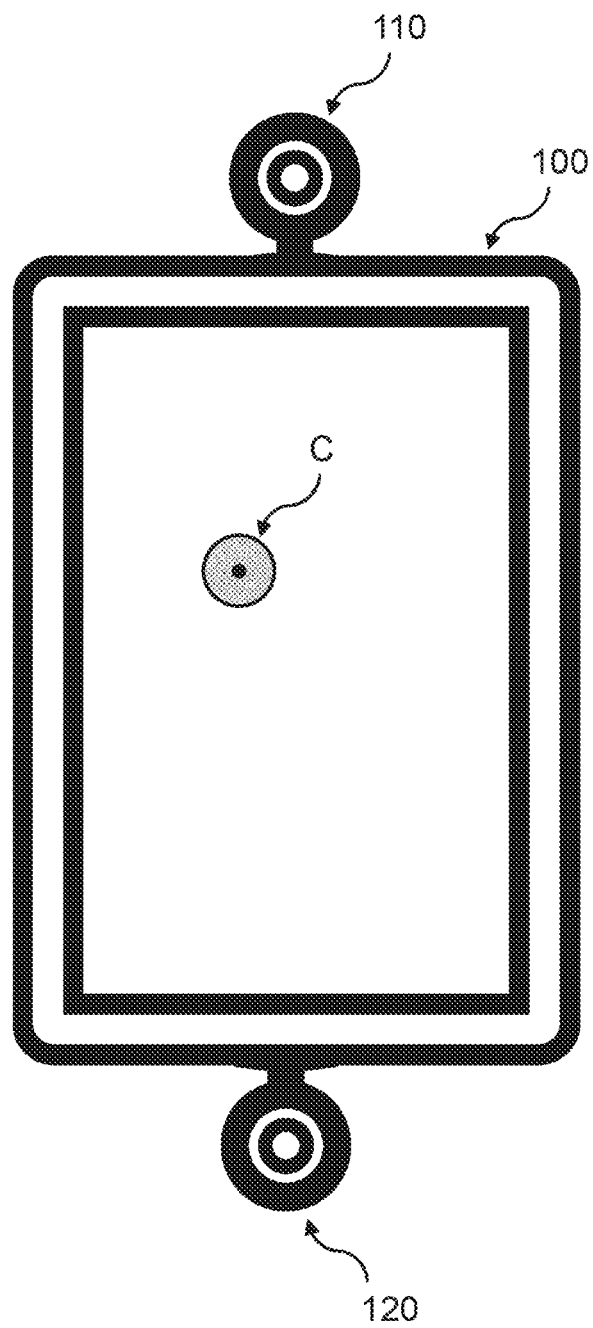
FIG. 1: A schematic illustration of an electronic display according to embodiments of the present invention.

FIG. 1 is a first schematic illustration of an electronic display 100. Two depth cameras 110, 120 are mounted at edges of the electronic display 100, a first depth camera 110 at the upper edge and a second depth camera 120 at the lower edge. The electronic display 100 displays a cursor C which hovers on the electronic display 100 corresponding to a user input, in particular using an input object 200. The input object 200 may be a finger of a user, a hand of a user, the arm of a user, or a dedicated input device as for example shown in FIG. 11.

Figure 2:
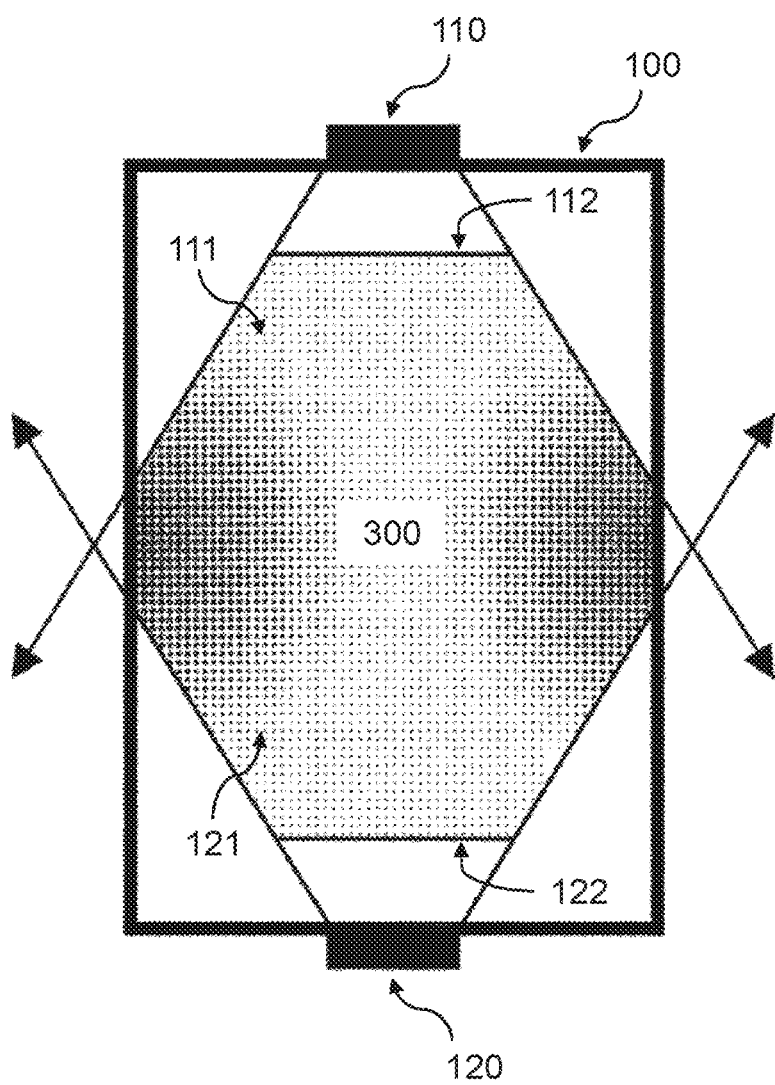
FIG. 2: A schematic illustration of an electronic display with a 2D-view of spatial input areas according to embodiments of the present invention.

FIG. 2 schematically illustrates a first spatial input area 111 of the first depth camera 110 and a second spatial input area 121 of the second depth camera 120. The first depth camera 110 and second depth camera 120 are essentially facing each other due to their mounting positions as describes above. Thus, the first spatial input area 111 and the second spatial input area 121 have an overlap which is illustrated by dots in FIG. 2. The depicted interaction area 300 is in general independent from the overlapping area of the first and second spatial input area 111, 121. Thus, the interaction area 300 may be understood covering a meaningful part of the field of views of both depth cameras 110, 120, particularly also including the corners of the electronic display 100 where apparently there is no overlap of the spatial input areas 111, 121. However, in a specific embodiment, the interaction area 300 may be equal to the overlapping area of the first and second spatial input area 111, 121. The first spatial input area 111 comprises a first spatial boundary 112 and the second spatial input area 121 comprises a second spatial boundary 122. Inside each of the spatial input areas 111, 121, a respective spatial fading layer may be spatially located adjacent to the respective spatial boundary 112, 122, wherein the spatial fading layers each have a spatial extension.

3D-point-fading according to the present invention may be performed for 3D-points which are positioned within a respective spatial fading layer. Inside each of the spatial input areas 111, 121, a spatial fading layer may be spatially located adjacent to the respective spatial boundary 112, 122, wherein the spatial fading layers each have a spatial extension. The 3D-point-fading may be performed for 3D-points which are positioned within a respective spatial fading layer. The spatial fading layers may for example have an extent of approximately 5 cm, substantially perpendicular to the respective spatial boundary 112, 122. Therefore, the spatial fading layers have the function of a transition layer in which a 3D-point is given a lower weight depending on its specific position within the layer. To put it in other words, the spatial fading layer can be understood as a transition layer in which a 3D-point is given a lower weight depending on its specific position within the layer. By this, kind of a buffer zone is set up at the respective spatial boundaries 112, 122 of the spatial input areas 111, 121 in which inaccuracies that may occur towards the boundaries 112, 122 of the spatial input layers 111, 121 are compensated by fading. In a preferred embodiment, fading of the 3D-points is only performed within the spatial fading layers. The spatial extension of the spatial fading layers may be adjustable.

For 3D-point fading, a weighting function which at least considers the dedicated position of the 3D-points within the spatial fading layer may be used. The dedicated position may be in particular the distance within the spatial extension of a respective spatial fading layer perpendicular to the respective spatial boundary 112, 122. The weighting function may be a linear function for facilitating continuous weighting, for example having a range between 0 and 1, wherein the weight of a 3D-point is decreasing along the spatial extension towards the spatial boundary. 3D-points which are within the first and second spatial input areas 111, 121 and not within one of the spatial fading layers may be determined to have a weight equal to 1, irrespective of the dedicated positions of the 3D-points. 3D-points which are outside the first and second spatial input areas 111, 121 may be determined to have a weight equal to 0, irrespective of the dedicated positions of the 3D-points.

Figure 3:
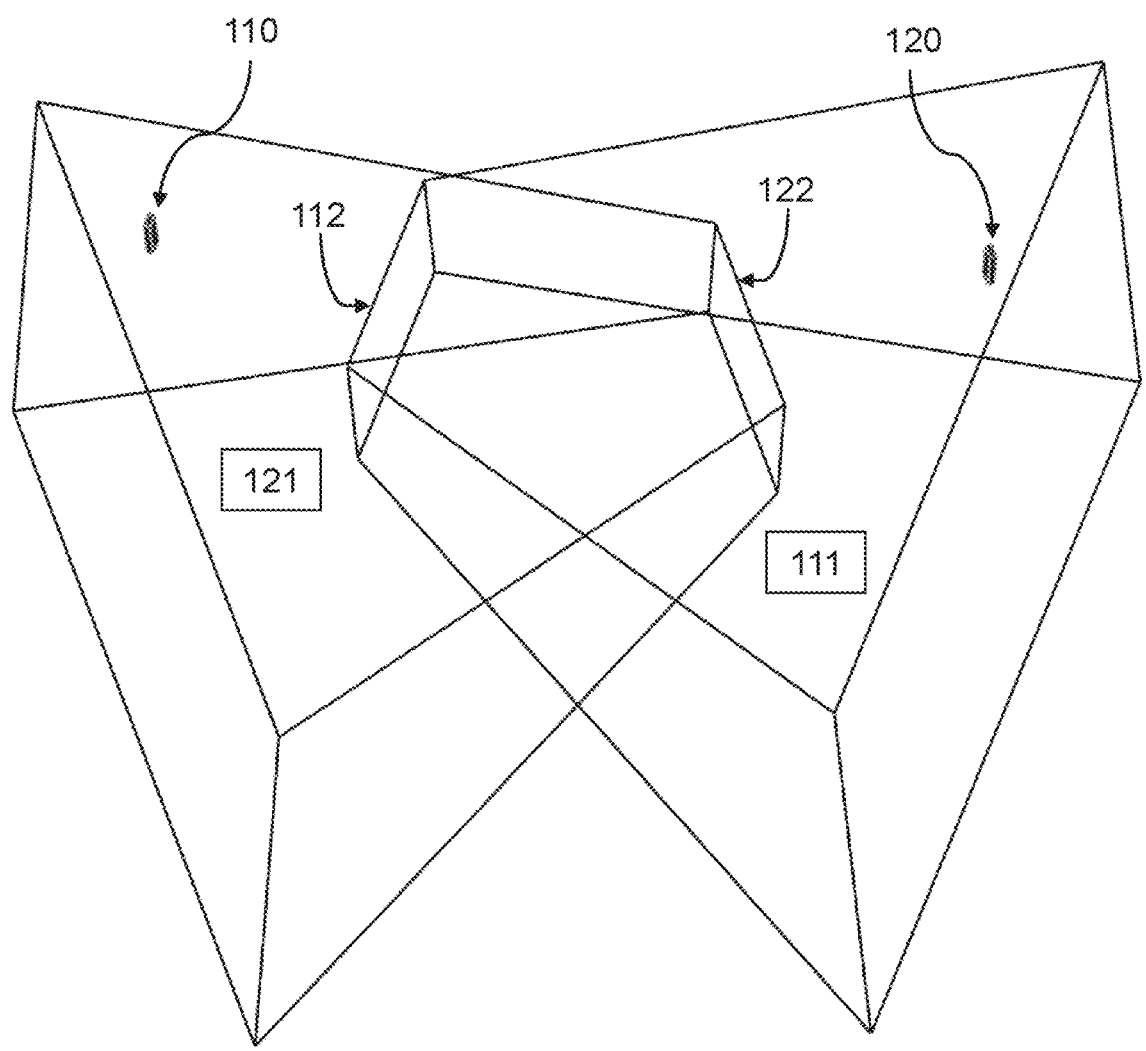
FIG. 3: A schematic illustration of spatial input areas in a 3D-view according to embodiments of the present invention.
Figure 4A:
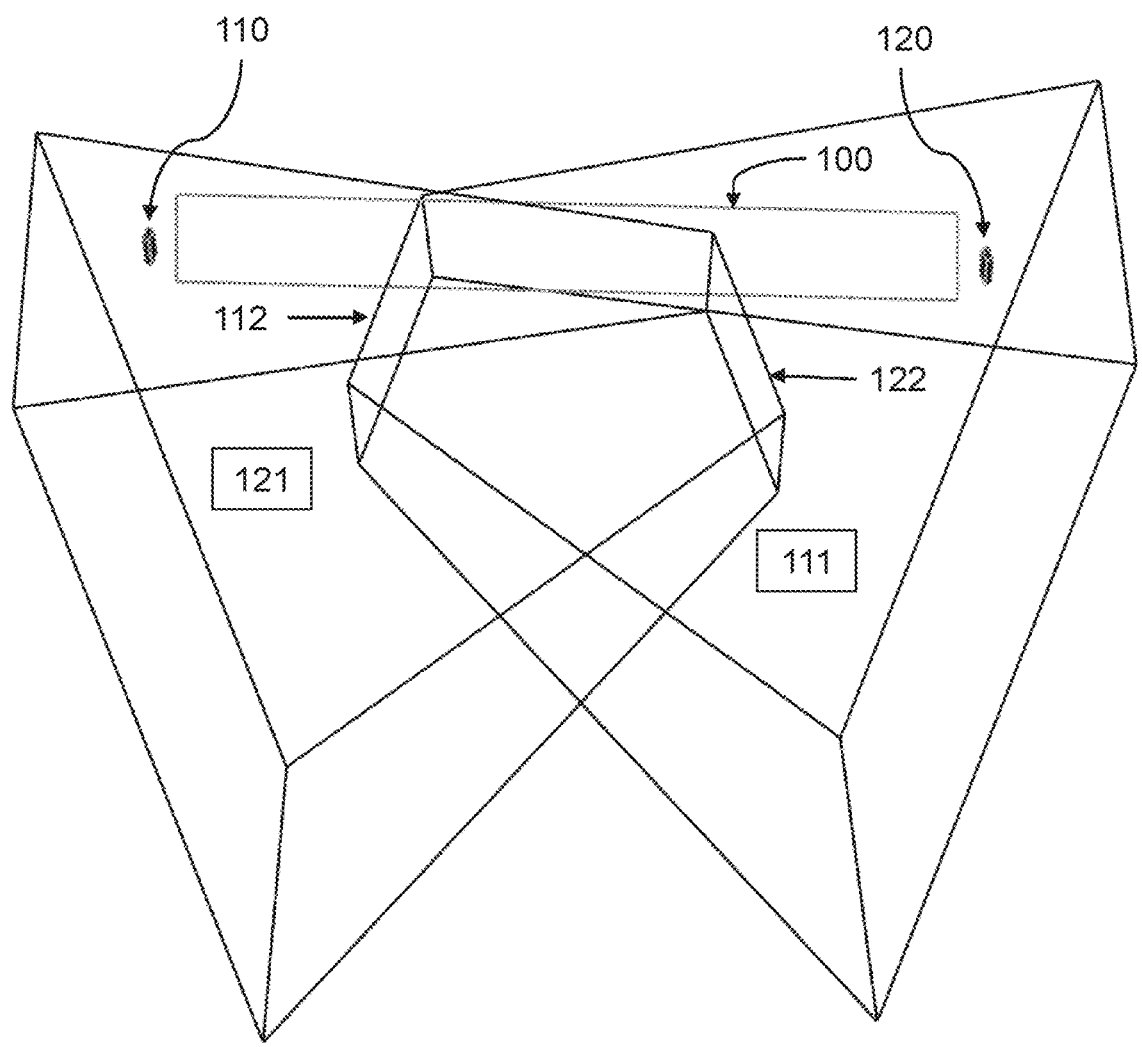
FIG. 4a: A first schematic illustration of spatial input areas in a 3D-view including an illustration of an electronic display according to embodiments of the present invention.
Figure 4B:
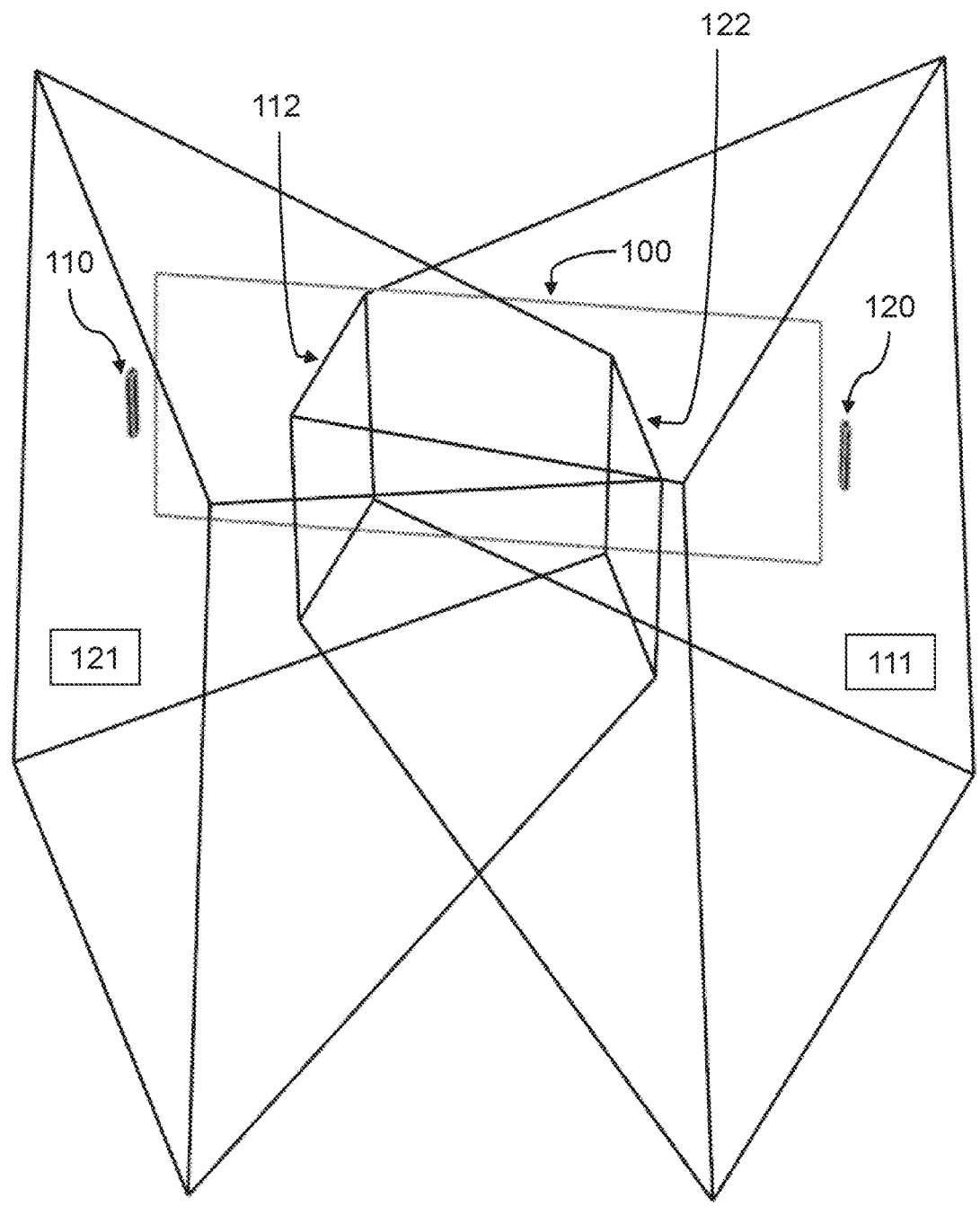
FIG. 4b: A second schematic illustration of spatial input areas in a 3D-view including an illustration of an electronic display according to embodiments of the present invention.
Figure 4C:
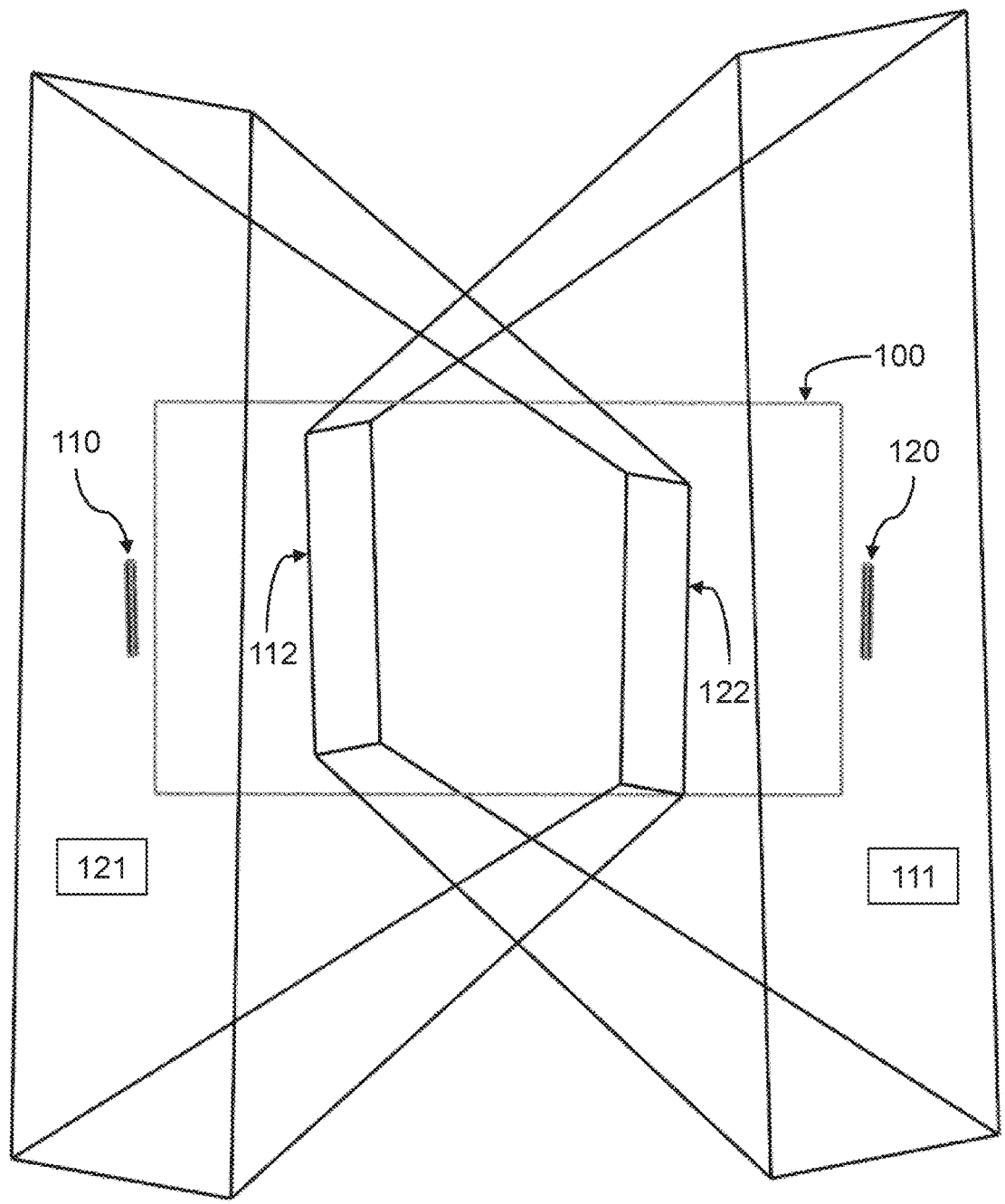
FIG. 4c: A third schematic illustration of spatial input areas in a 3D-view including an illustration of an electronic display according to embodiments of the present invention.
Figure 5:
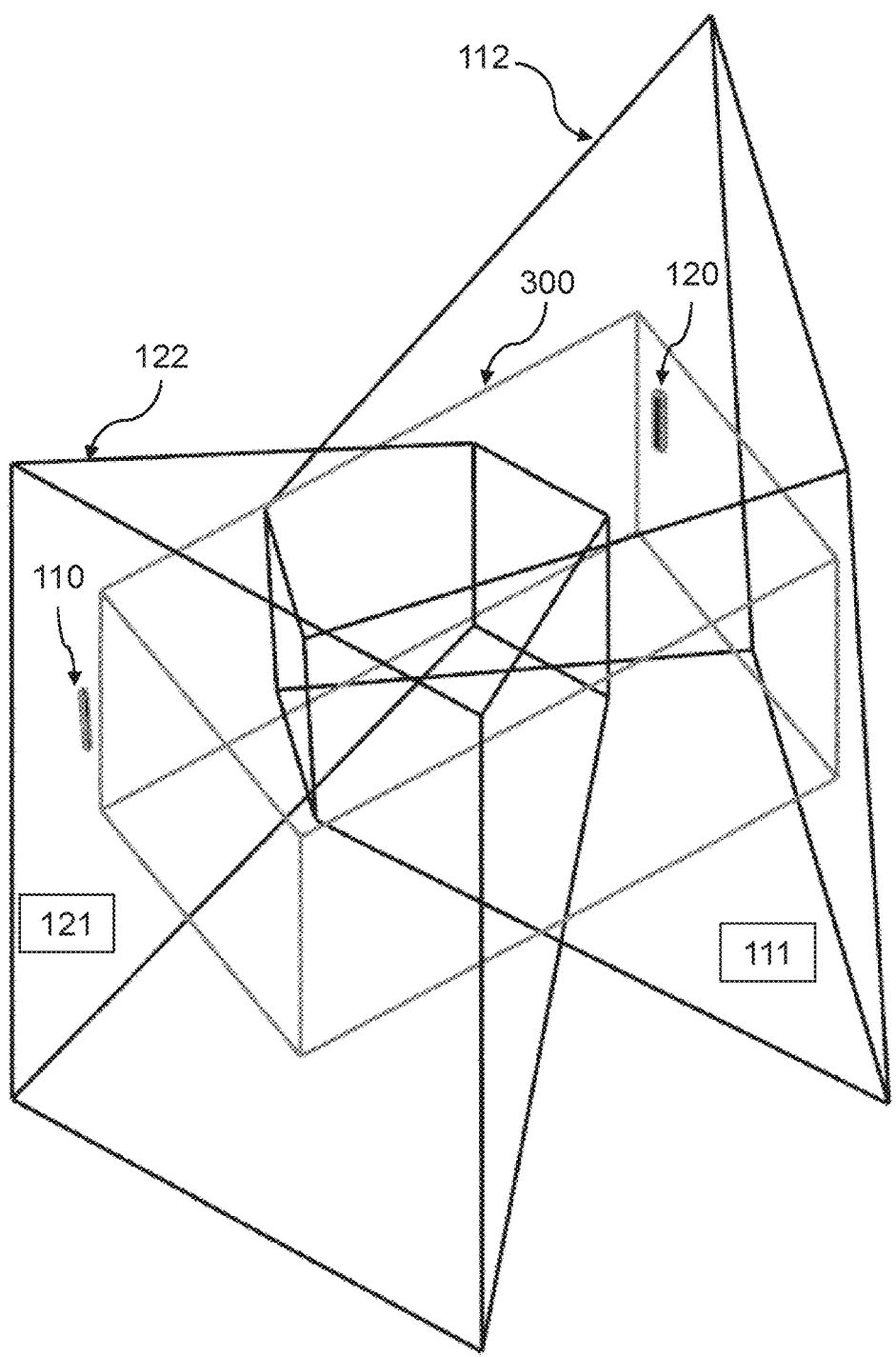
FIG. 5: A schematic illustration of spatial input areas in a 3D-view including an illustration of an interaction area according to embodiments of the present invention.

FIG. 3 is a 3D-view showing the first depth camera 110, the second depth camera 120 and the respective first and second spatial input areas 111, 121. Further, the first and second spatial boundaries 112, 122 are illustrated. In FIGS. 4a, 4b and 4c, it is further illustrated the electronic display 100. Each of the FIGS. 4a, 4b and 4c show a different 3D-perspective for the sake of better comprehensibility. In FIG. 5, it is further illustrated a schematic interaction area 300.

In all FIGS. 3, 4a, 4b, 4c and 5, the respectively illustrated first and second spatial input area 111, 121 are frustums of a pyramid which are illustrated as closed geometric spaces. Of course, the spatial input areas 111, 121 can also be represented as open frustums of a pyramid, such as in the further figures describes below. Whether the spatial input areas 111, 121 are represented as closed or open geometric entities has no influence on the definition of the respective spatial boundaries 112, 122, because as already discussed in the upper part of the present description, a spatial boundary 112, 122 can also be defined for a part of the edges of the respective spatial input area 111, 121. In a preferred embodiment, a respective spatial boundary 112, 122 of a spatial input area 111, 121 is defined only for the upper frustum surface of the corresponding frustum of a pyramid forming the spatial input area 111, 121 (facing the respective depth camera). This is a preferred embodiment, since depth cameras 110, 120 often have problems with the precise recording of input objects 200 at close range. By defining the spatial boundaries 112, 122 according to this preferred embodiment, 3D-points which are captures in a close range to a recording depth camera 110, 120, are faded out in order to get more precise, in particular unadulterated, 3D-points through the other depth camera(s) 110, 120.

Figure 6A:
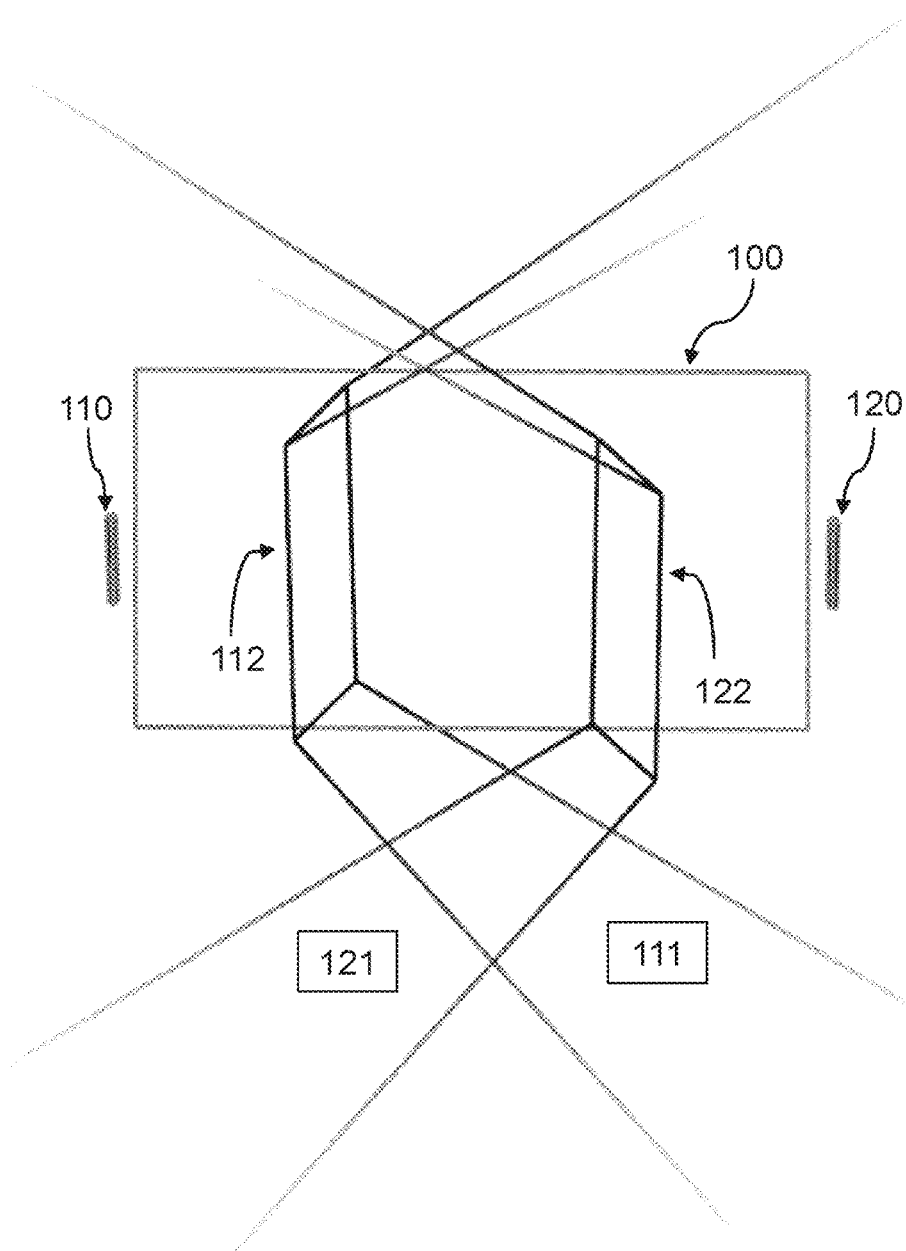
FIG. 6a: A first schematic illustration of spatial input areas in a 3D-view including an illustration of an electronic display, the spatial input areas being open in observation direction of the respective camera according to embodiments of the present invention.
Figure 6B:
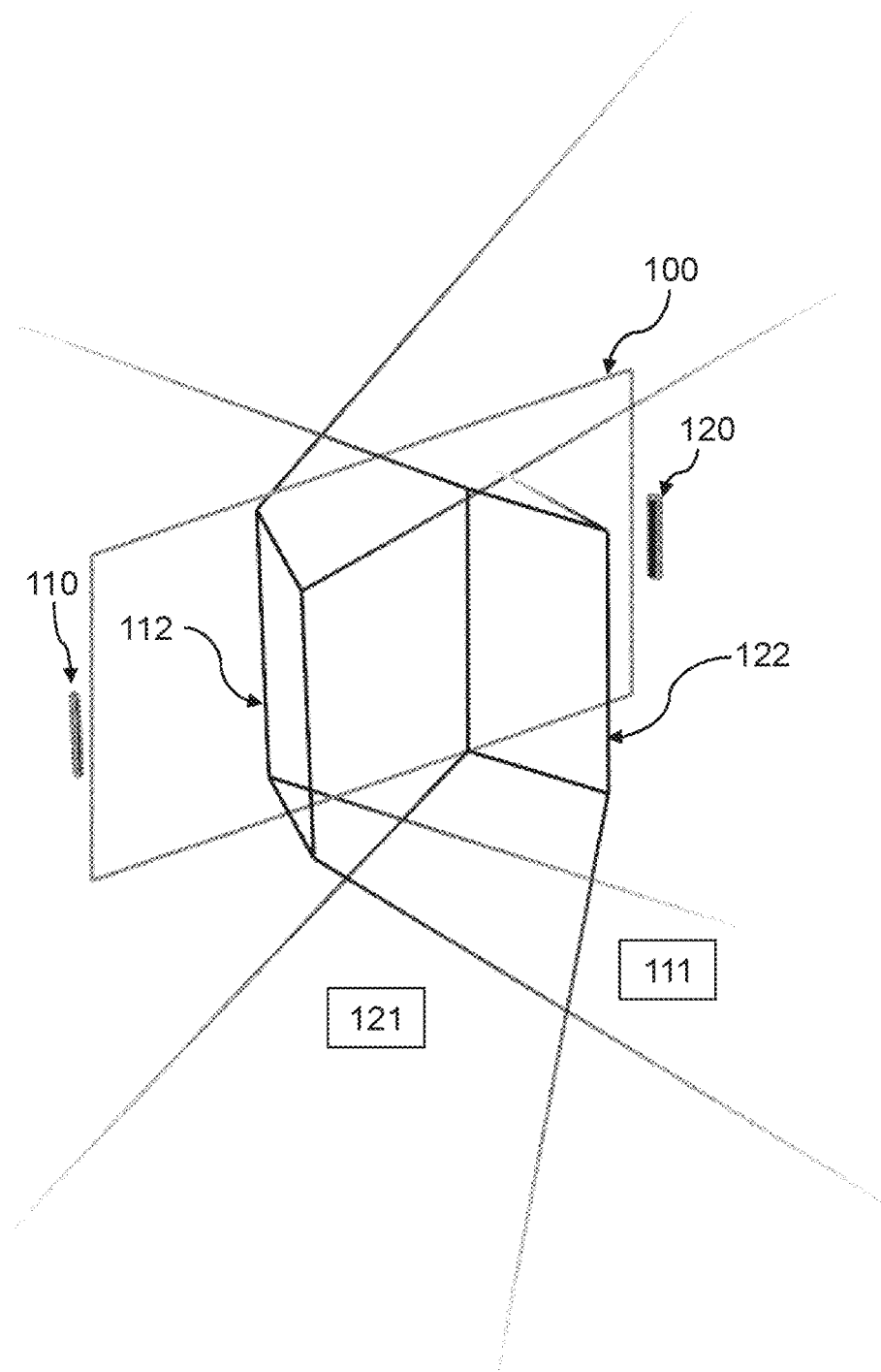
FIG. 6b: A second schematic illustration of spatial input areas in a 3D-view including an illustration of an electronic display, the spatial input areas being open in observation direction of the respective camera according to embodiments of the present invention.
Figure 7A:
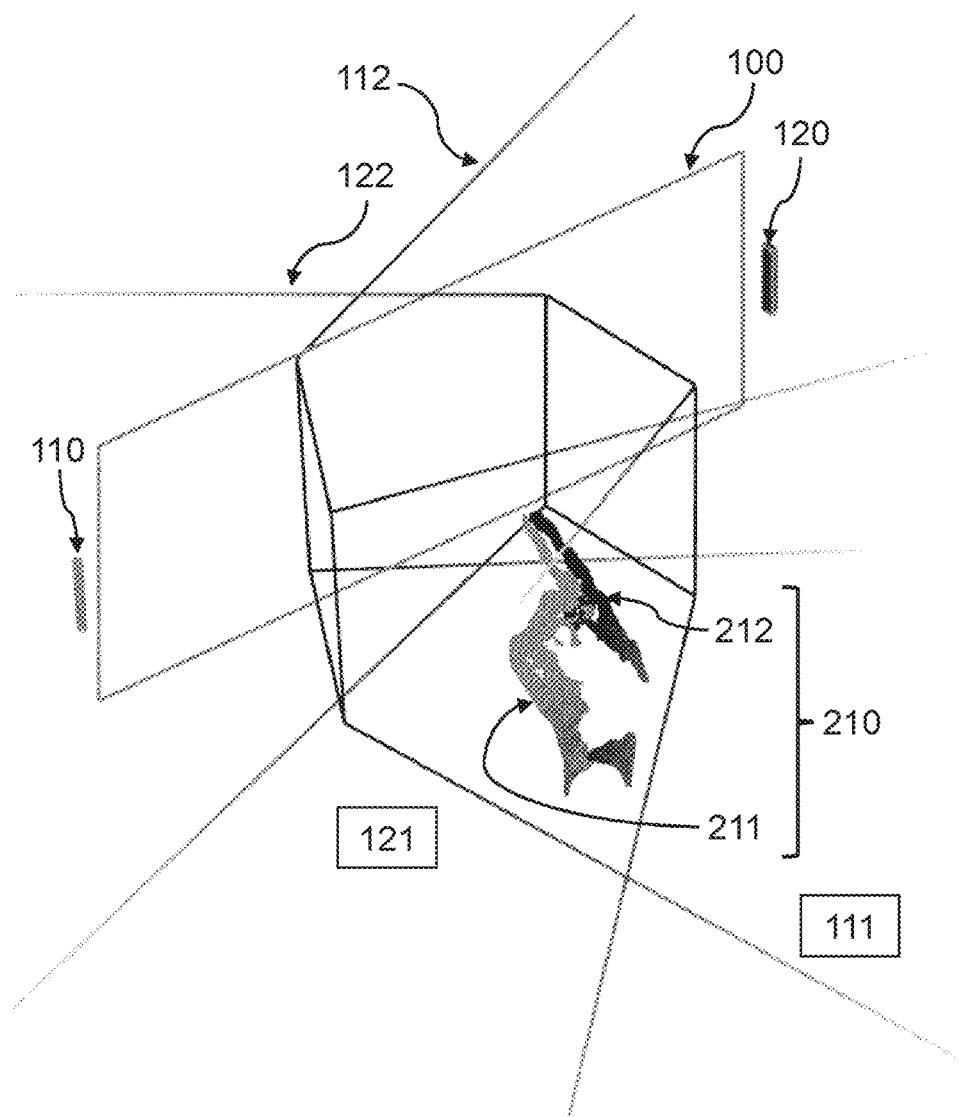
FIG. 7a: A first schematic illustration of spatial input areas in a 3D-view including an illustration of an electronic display and a set of 3D-points corresponding to an input object according to embodiments of the present invention.
Figure 7B:
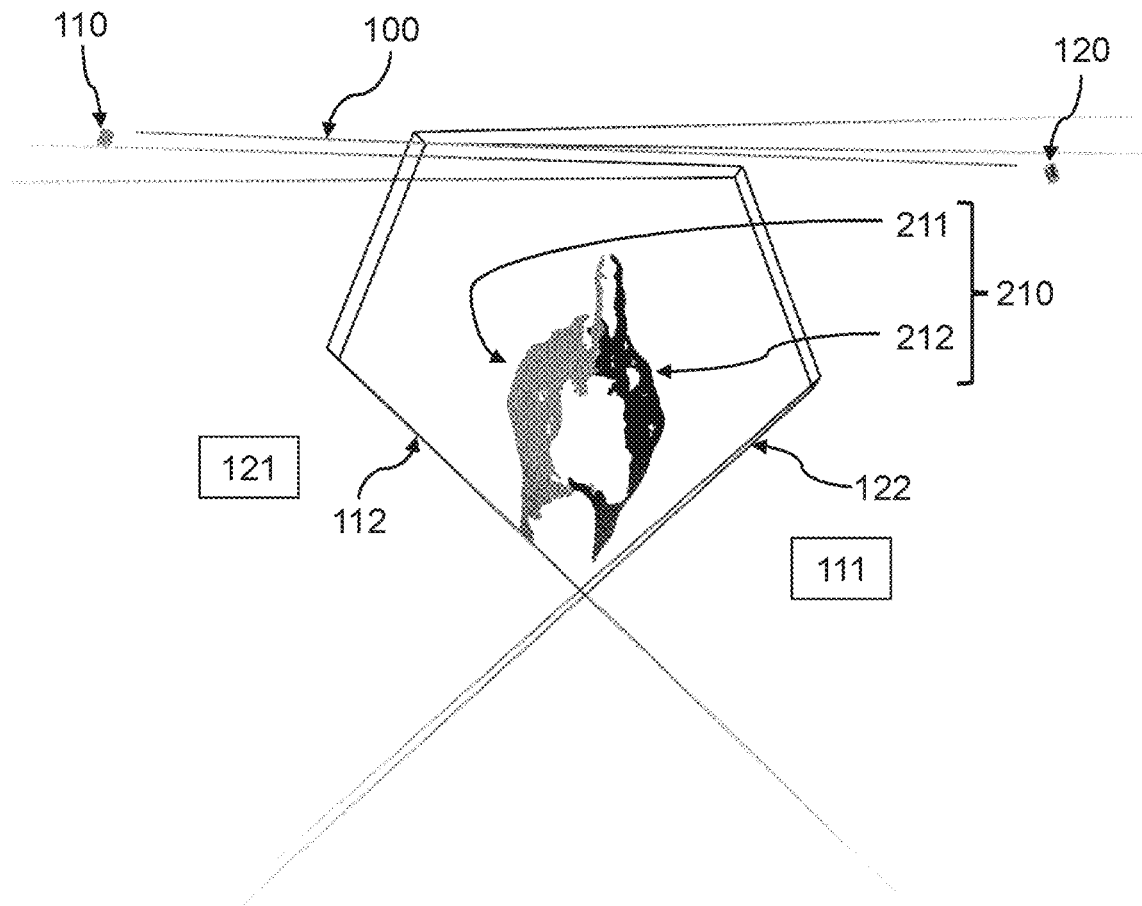
FIG. 7b: A second schematic illustration of spatial input areas in a 3D-view including an illustration of an electronic display and a set of 3D-points corresponding to an input object according to embodiments of the present invention.

FIGS. 6a and 6b are 3D-views of different perspectives showing an electronic display 100, a first depth camera 110, a second depth camera 120 and respective first and second spatial input areas 111, 121, wherein the input areas 111, 121 are each illustrated as an open frustum of a pyramid. Further, first and second spatial boundaries 112, 122 are illustrated corresponding to the first and second spatial input areas 111, 121 of the first and second depth cameras 110, 120. FIGS. 7a and 7b are 3D-views of different perspectives further illustrating a set of 3D-points 210 corresponding to an input object 200. The set of 3D-points 210 includes a first subset of 3D-points 211 and a second subset of 3D-points 212. The first subset of 3D-points 211 consists of 3D-points that are defined based on image data captured by the first depth camera 110. And the second subset of 3D-points 212 consists of 3D-points that are defined based on image data captured by the second depth camera 120. For the sake of better comprehensibility, the first depth camera 110 and the first subset of 3D-points 211 are colored in light grey as they belong together. Accordingly, the second depth camera 120 and the second subset of 3D-points 212 are colored in black as they belong together.

Figure 8A:
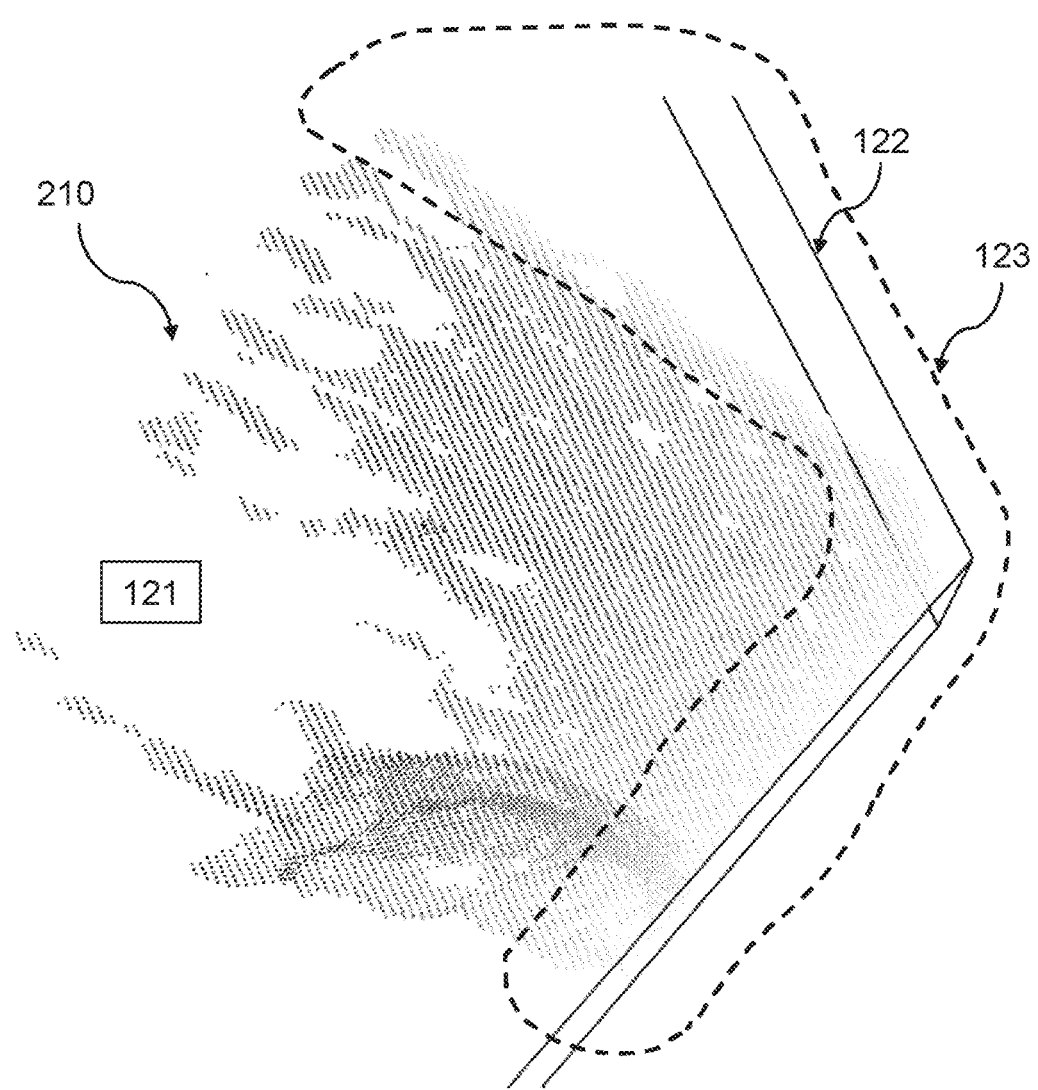
FIG. 8a: A first schematic illustration of performing 3D-point fading according to embodiments of the present invention.

FIG. 8a is a detailed view of a part of a set of 3D-points 210 in the second spatial input area 121, wherein the illustrated 3D-points are faded out towards the second spatial boundary 122. For the sake of clarity, the area in which 3D-point fading 123 is performed, is marked by a dotted line. Preferably there is a spatial fading layer in this area as described in more detail in the upper part of the present description. This spatial fading layer may be a layer at the spatial boundary 122. Within this spatial fading layer, 3D-point fading 123 may be performed based on a weighting function that assigns weights to the 3D-points. It is preferred that the weighting function is a linear function which at least considers the dedicated position of the 3D-points within the spatial fading layer, preferably the distance within the spatial extension perpendicular to the respective spatial boundary 122. The function may have a range between 0 and 1, wherein the weight of a 3D-point is decreasing along the spatial extension towards the spatial boundary 122. As can be seen in FIG. 8a, exactly this embodiment is shown, which is indicated by the fact that the 3D-points in a region (spatial fading layer) close to the spatial boundary become progressively lighter.

Figure 8B:
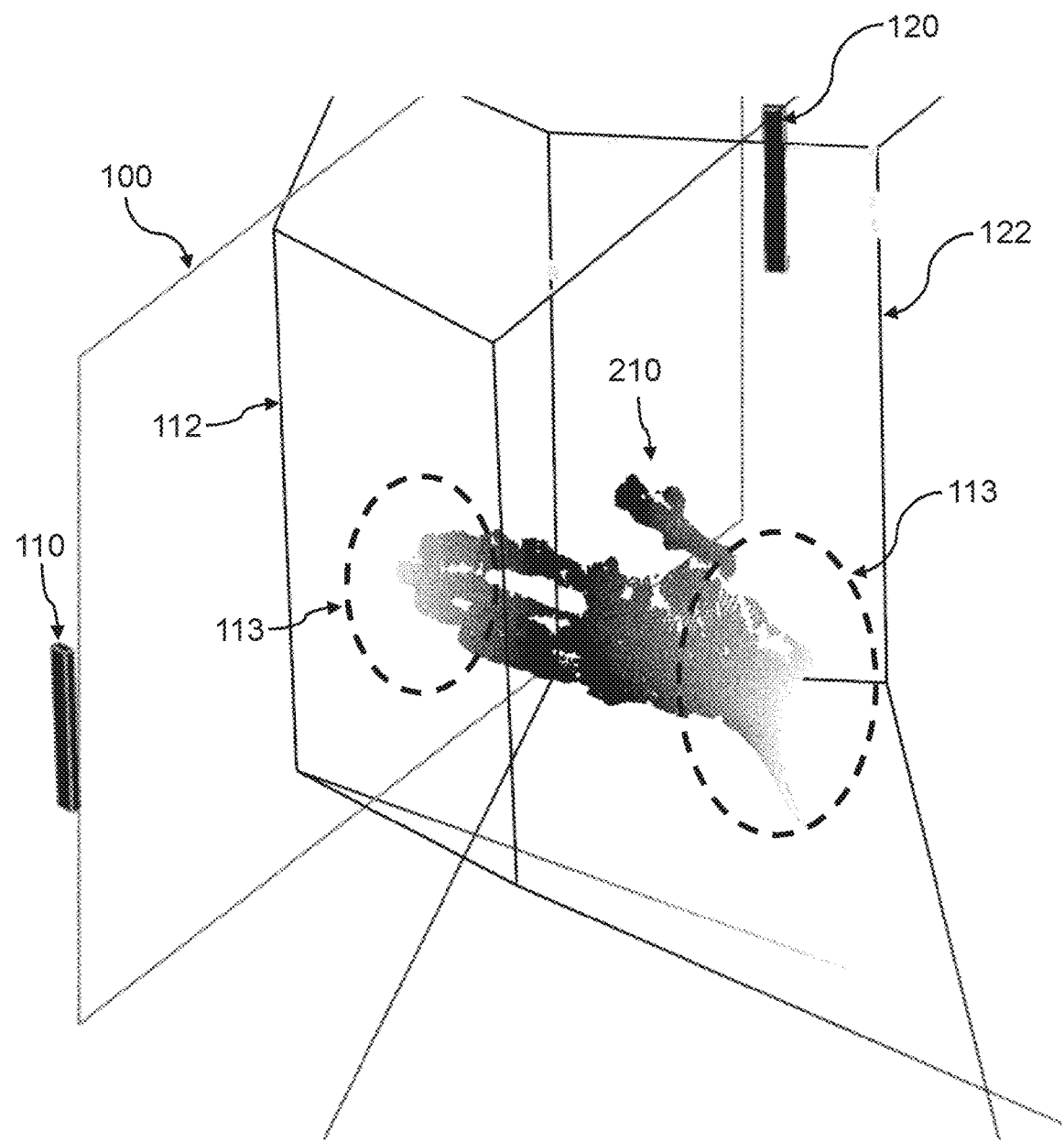
FIG. 8b: A second schematic illustration of performing 3D-point fading according to embodiments of the present invention.
Figure 8C:
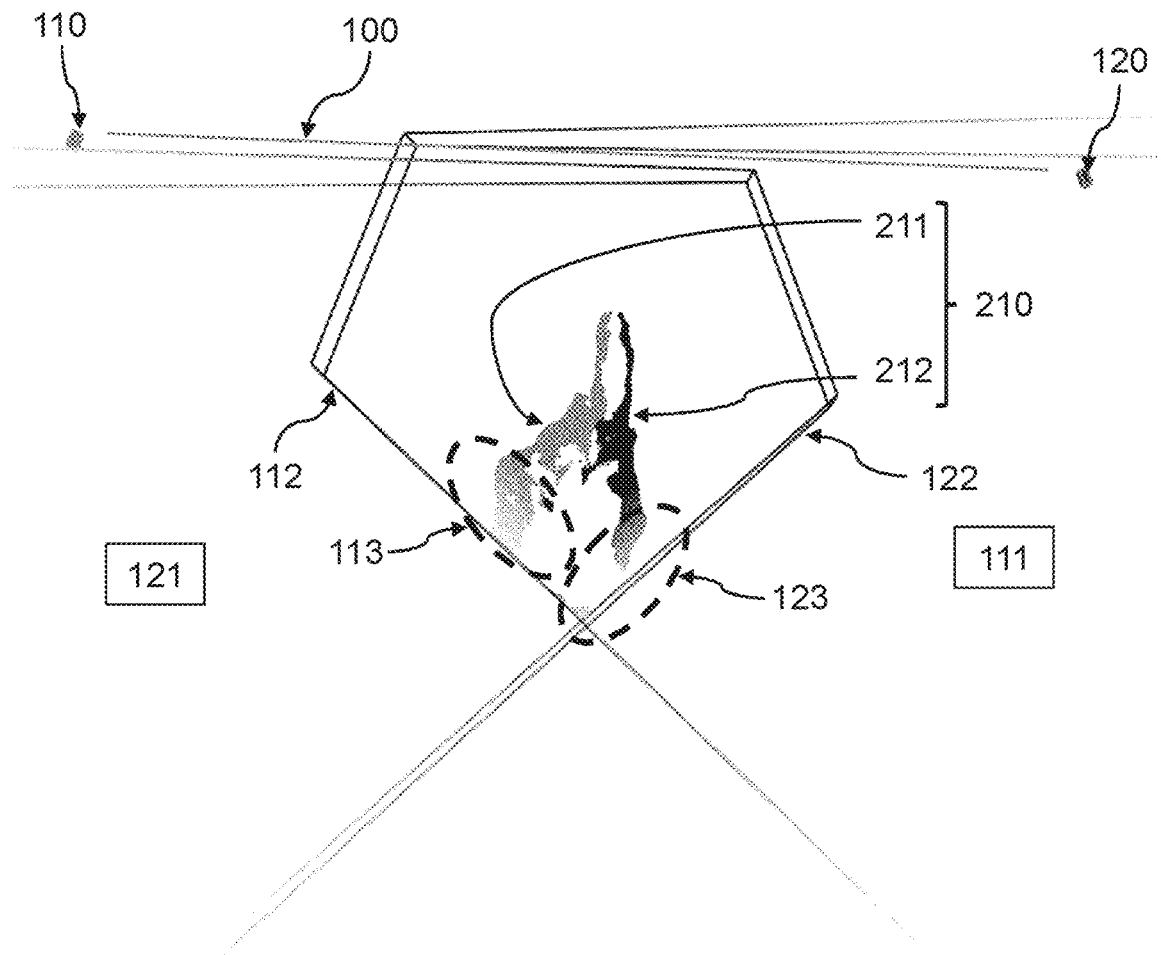
FIG. 8c: A third schematic illustration of performing 3D-point fading according to embodiments of the present invention.
Figure 8D:
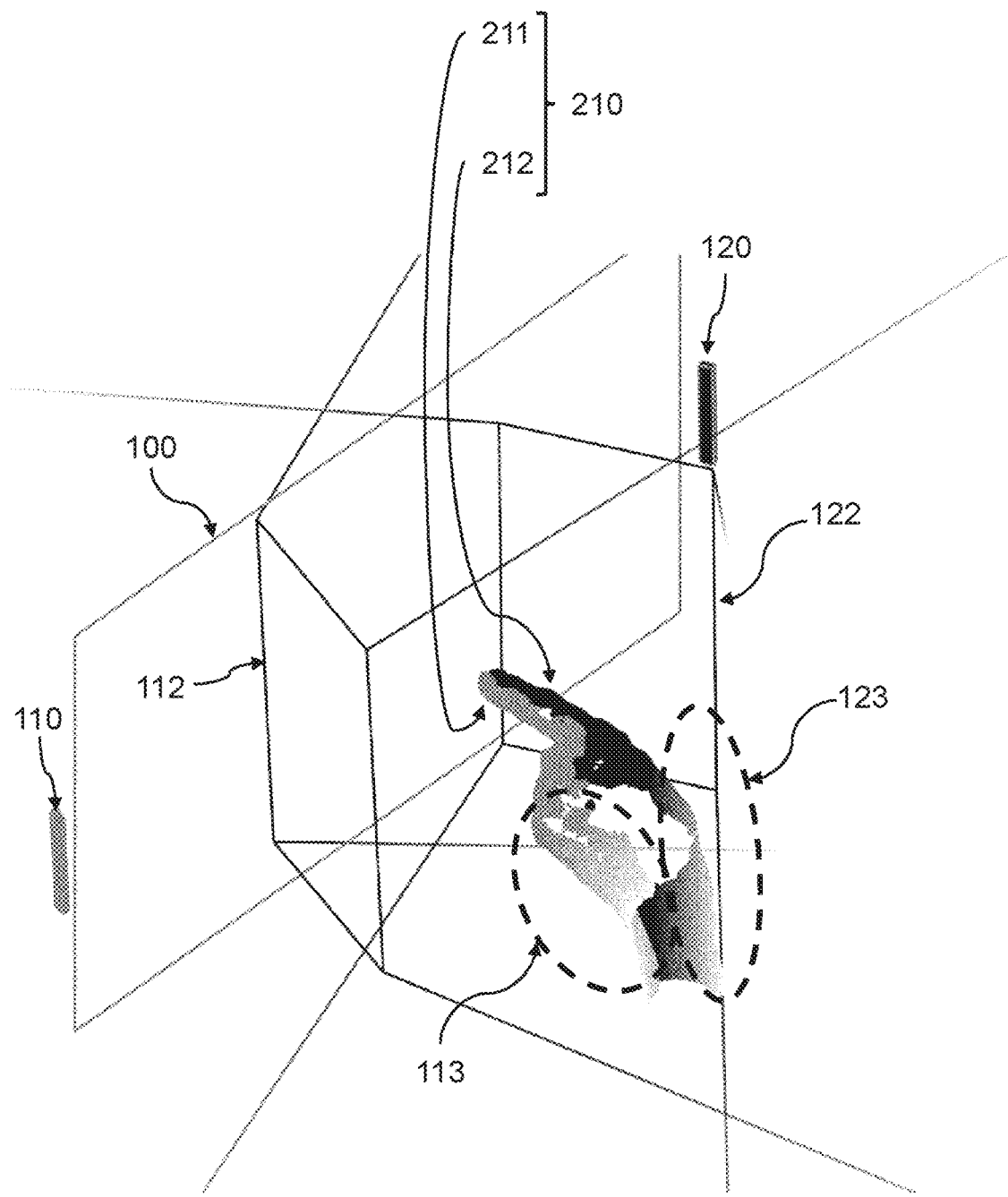
FIG. 8d: A fourth schematic illustration of performing 3D-point fading according to embodiments of the present invention.

FIGS. 8b, 8c and 8d are, compared to FIG. 8a, superordinate illustrations showing 3D-point fading 113, 123. The reference sign 113 is used whenever fading is performed for the first spatial input area 111 and first depth camera 110. 3D-point fading 113 is thus performed for 3D-points near the first spatial boundary 112. Accordingly, reference sign 123 is used whenever fading is performed for the second spatial input area 121 and second depth camera 120. 3D-point fading 123 is thus performed for 3D-points near the second spatial boundary 122. For the sake of clarity, areas in which 3D-point fading 113, 123 is performed, are marked by dotted lines. For the sake of further comprehensibility, in FIGS. 8c and 8d, the first depth camera 110 and the first subset of 3D-points 211 are colored in light grey as they belong together. Accordingly, the second depth camera 120 and the second subset of 3D-points 212 are colored in black as they belong together.

Figure 9A:
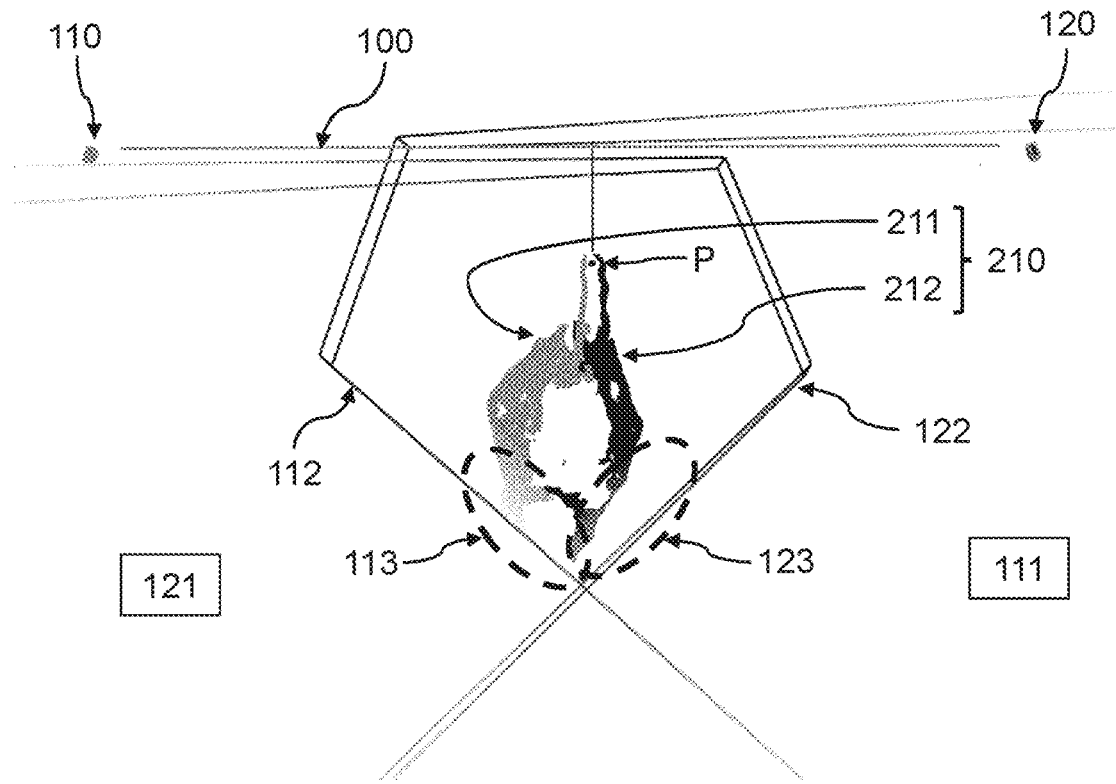
FIG. 9a: A first schematic illustration of spatial input areas in a 3D-view including an illustration of an electronic display, a set of 3D-points corresponding to an input object and a touchless control pointer according to embodiments of the present invention.
Figure 9B:
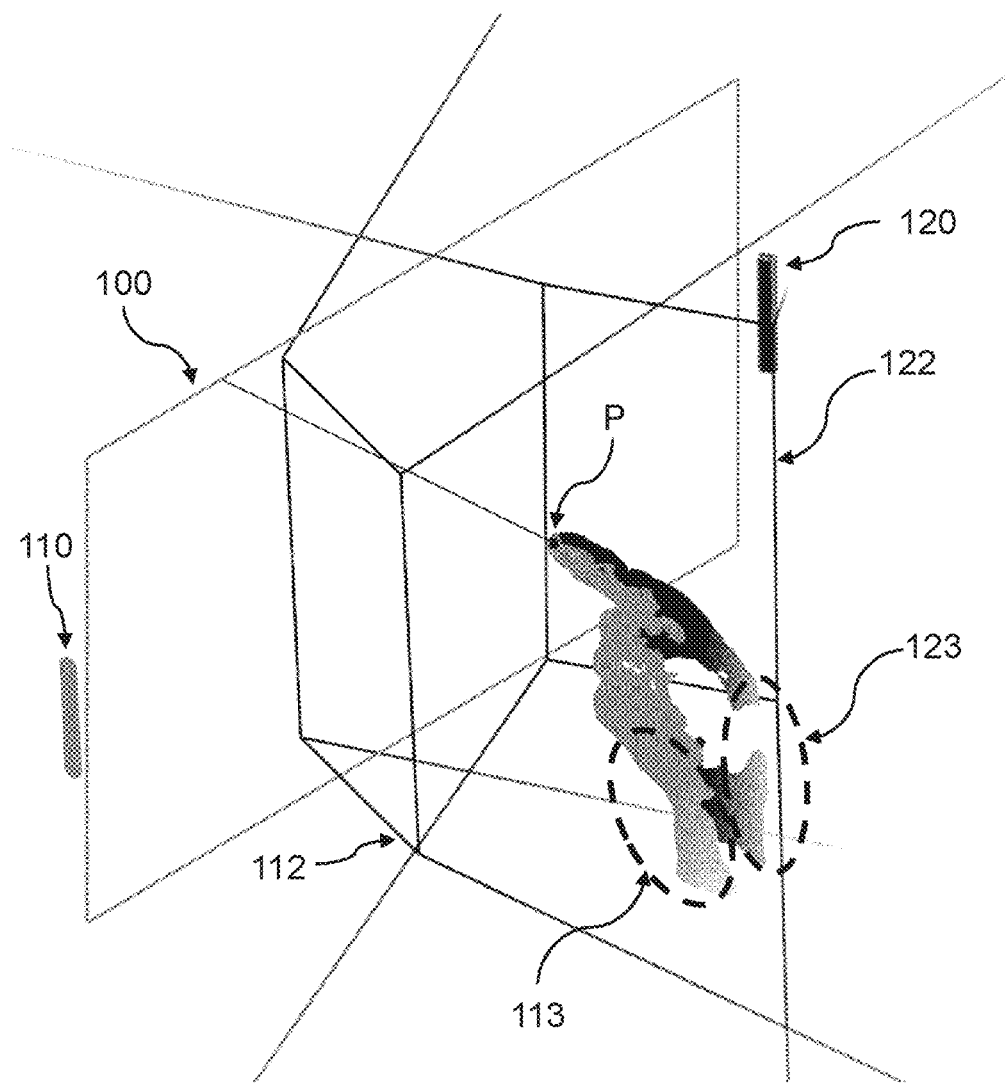
FIG. 9b: A second schematic illustration of spatial input areas in a 3D-view including an illustration of an electronic display, a set of 3D-points corresponding to an input object and a touchless control pointer according to embodiments of the present invention.

FIG. 9a is similar to FIG. 8c, wherein a touchless control pointer P is shown. Accordingly, FIG. 9b is similar to FIG. 8d. The touchless control pointer P may be the result of a spatial center point determination for a part of the set of 3D-points 210, corresponding to an input object 200, that protrudes furthest in the direction of the electronic display 100. It may in particular be provided that the weights of the 3D-points are considered for the determination of the touchless control pointer P. Based on the touchless control pointer P, a cursor C may be defined and shown on the electronic display 100 as a hovering cursor C. The determination of the position of the cursor C may for example include performing a projection of the touchless control pointer perpendicular to the electronic display 100. Optionally, also the shape of the set of 3D-points, including for example the direction in which an elongated part of the input object 200 points, is taken into account. Such elongated part of the input object 200 may, in the example on hand, be the index finger of a hand.

Figure 10A:
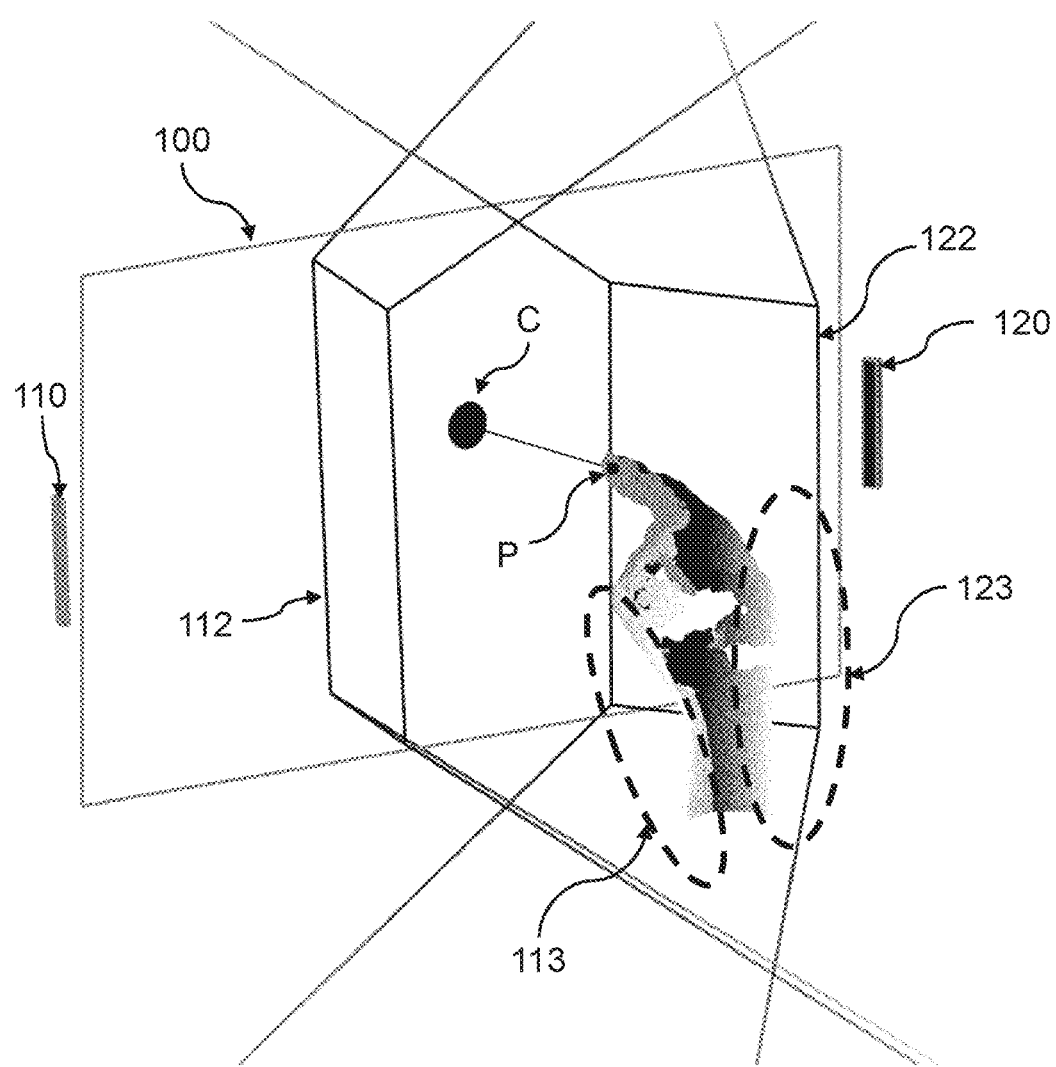
FIG. 10a: A first schematic illustration of spatial input areas in a 3D-view including an illustration of an electronic display, a set of 3D-points corresponding to an input object, a touchless control pointer and a cursor according to embodiments of the present invention.
Figure 10B:
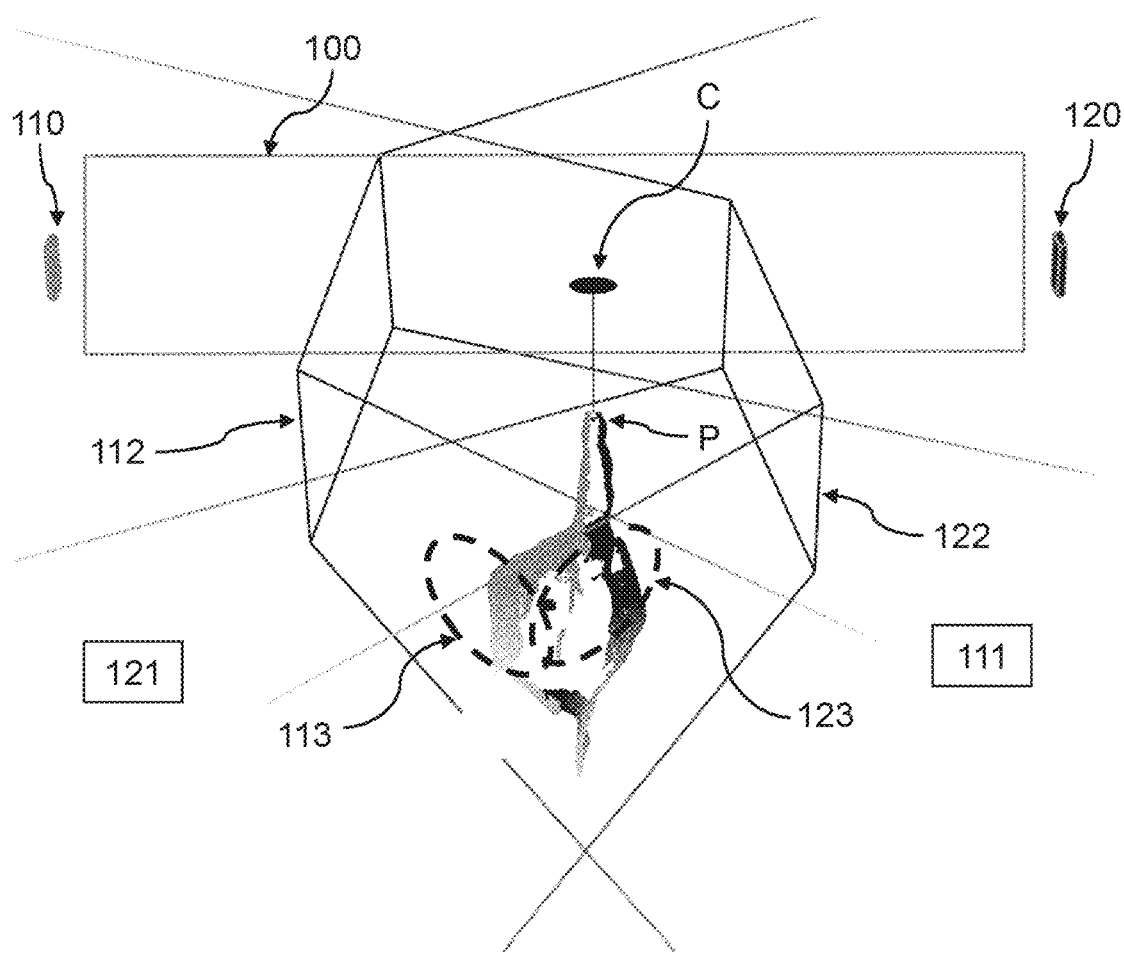
FIG. 10b: A second schematic illustration of spatial input areas in a 3D-view including an illustration of an electronic display, a set of 3D-points corresponding to an input object, a touchless control pointer and a cursor according to embodiments of the present invention.

In FIGS. 10a and 10b the cursor C is illustrated. Further, for the sake of clarity, a projection line between the touchless control pointer P and the cursor C is depicted.

Figure 11:
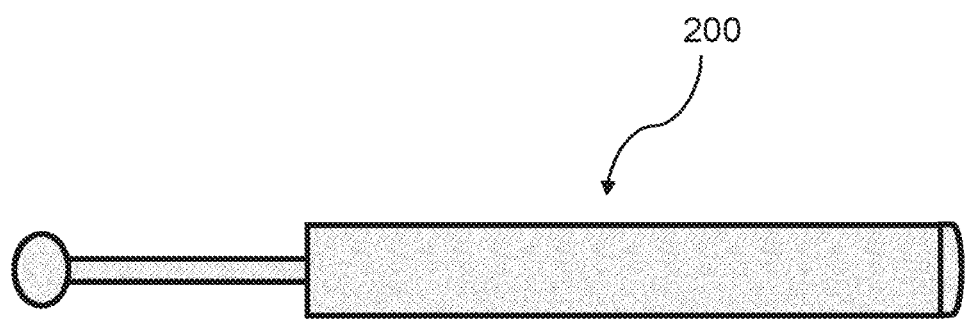
FIG. 11: A schematic illustration of an alternative input object according to embodiments of the present invention.

FIG. 11 shows an example of an input object 200 being a dedicated input device having approximately the shape of a pen.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device, or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

REFERENCE SIGNS 100 electronic display
110 first depth camera
111 first spatial input area
112 first spatial boundary
120 second depth camera
121 second spatial input area
122 second spatial boundary
113, 123 3D-point fading
200 input object
210 set of 3D-points
211 first subset of 3D-points
212 second subset of 3D-points
300 interaction area
P touchless control pointer
c cursor

The invention claimed is:

1. A computer-implemented touchless user-interface control method for an electronic display (100), comprising:
 detecting, using at least a first and a second depth camera (110, 120), an input object (200) and determining a set of 3D-points (210) corresponding to the input object (200);
 wherein the set of 3D-points (210) includes a first subset of 3D-points (211) which is based on data captured by the first depth camera (110), and a second subset of 3D-points (212) which is based on data captured by the second depth camera (120);
  performing 3D-point-fading (113, 123), wherein weights are assigned to the 3D-points, wherein 3D-points of the first subset (211) are weighted depending on their positions relative to the first depth camera (110), and 3D-points of the second subset (212) are weighted depending on their positions relative to the second depth camera (120), wherein the method further comprises:
 defining, for the first depth camera (110), a first spatial input area (111) for the recognition of touchless input, the first spatial input area (111) having a first spatial boundary (112);
 defining, for the second depth camera (120), a second spatial input area (121) for the recognition of touchless input, the second spatial input (121) area having a second spatial boundary (122);
 wherein 3D-point-fading (113, 123) is performed within the respective spatial input area (111, 121);
 wherein the method further comprises:
 defining, inside each of the spatial input areas (111, 121), a spatial fading layer spatially located adjacent to the respective spatial boundary (112, 122), wherein the spatial fading layers each have a spatial extension;
 wherein 3D-point-fading (113, 123) is performed for 3D-points which are positioned within a respective spatial fading layer;
 wherein the spatial extension of the spatial fading layers is adjustable.

2. The computer-implemented method of claim 1, wherein the method further comprises:
 determining a touchless control pointer (P) based on the 3D-points and the assigned weights.

3. The computer-implemented method of claim 1, wherein 3D-points of the first subset (211) are weighted depending on their positions relative to the first spatial boundary (112), and 3D-points of the second subset (212) are weighted depending on their positions relative to the second spatial boundary (122).

4. The computer-implemented method of claim 1, wherein each of the spatial input areas (111, 121) are distanced in a respective observation direction from the respective depth camera (110, 120).

5. The computer-implemented method of claim 1, wherein the weight of the 3D-points which are within a spatial fading layer is determined based on a weighting function which at least considers the dedicated position of the 3D-points within the spatial fading layer.

6. The computer-implemented method of claim 5, wherein the weight of 3D-points which are within the first and second spatial input areas (111, 121) and not within one of the spatial fading layers, is determined irrespective of the dedicated positions of the 3D-points.

7. The computer-implemented method of claim 5, wherein the weighting function is a linear function for facilitating continuous weighting, wherein the weight of a 3D-point is decreasing along the spatial extension towards the spatial boundary (112, 122).

8. The computer-implemented method of claim 1, wherein the weight of 3D-points which are outside the first and second spatial input areas (111, 121) is determined irrespective of the dedicated positions of the 3D-points.

9. The computer-implemented method of claim 1, wherein the spatial fading layer of the first spatial input area (111) is arranged at a predetermined part of the first spatial boundary (112), and wherein the spatial fading layer of the second spatial input area (121) is arranged at a predetermined part of the second spatial boundary (122).

10. A data processing apparatus, preferably an electronic display (100), comprising:
 a processor and
 a storage medium;
 wherein the storage medium stores a computer program for performing a touchless user-interface control method for an electronic display (100), comprising:
 detecting, using at least a first and a second depth camera (110, 120), an input object (200) and determining a set of 3D-points (210) corresponding to the input object (200);
 wherein the set of 3D-points (210) includes a first subset of 3D-points (211) which is based on data captured by the first depth camera (110), and a second subset of 3D-points (212) which is based on data captured by the second depth camera (120);
 performing 3D-point-fading (113, 123), wherein weights are assigned to the 3D-points, wherein 3D-points of the first subset (211) are weighted depending on their positions relative to the first depth camera (110), and 3D-points of the second subset (212) are weighted depending on their positions relative to the second depth camera (120) wherein the method further comprises:
 defining, for the first depth camera (110), a first spatial input area (111) for the recognition of touchless input, the first spatial input area (111) having a first spatial boundary (112);
 defining, for the second depth camera (120), a second spatial input area (121) for the recognition of touchless input, the second spatial input (121) area having a second spatial boundary (122);
 wherein 3D-point-fading (113, 123) is performed within the respective spatial input area (111, 121);
 wherein the method further comprises:
 defining, inside each of the spatial input areas (111, 121), a spatial fading layer spatially located adjacent to the respective spatial boundary (112, 122), wherein the spatial fading layers each have a spatial extension;

wherein 3D-point-fading (113, 123) is performed for 3D-points which are positioned within a respective spatial fading layer;

wherein the spatial extension of the spatial fading layers is adjustable.

11. A non-transitory storage medium comprising computer program instructions which, when the computer program instructions are executed by a computer, cause the computer to carry out a touchless user-interface control method for an electronic display (100), comprising:

detecting, using at least a first and a second depth camera (110, 120), an input object (200) and determining a set of 3D-points (210) corresponding to the input object (200);

wherein the set of 3D-points (210) includes a first subset of 3D-points (211) which is based on data captured by the first depth camera (110), and a second subset of 3D-points (212) which is based on data captured by the second depth camera (120);

performing 3D-point-fading (113, 123), wherein weights are assigned to the 3D-points, wherein 3D-points of the first subset (211) are weighted depending on their positions relative to the first depth camera (110), and 3D-points of the second subset (212) are weighted depending on their positions relative to the second depth camera (120) wherein the method further comprises:

defining, for the first depth camera (110), a first spatial input area (111) for the recognition of touchless input, the first spatial input area (111) having a first spatial boundary (112);

defining, for the second depth camera (120), a second spatial input area (121) for the recognition of touchless input, the second spatial input (121) area having a second spatial boundary (122);

wherein 3D-point-fading (113, 123) is performed within the respective spatial input area (111, 121);

wherein the method further comprises:

defining, inside each of the spatial input areas (111, 121), a spatial fading layer spatially located adjacent to the respective spatial boundary (112, 122), wherein the spatial fading layers each have a spatial extension;

wherein 3D-point-fading (113, 123) is performed for 3D-points which are positioned within a respective spatial fading layer;

wherein the spatial extension of the spatial fading layers is adjustable.

\* \* \* \* \*